United States Patent [19]

Deutschman

[11] 4,158,042

[45] Jun. 12, 1979

[54] RECOVERY OF ALUMINA FROM SILICEOUS MINERALS

[75] Inventor: John E. Deutschman, Kingston, Canada

[73] Assignee: Alcan Research and Development Limited, Montreal, Canada

[21] Appl. No.: 946,345

[22] Filed: Sep. 27, 1978

[30] Foreign Application Priority Data

Oct. 7, 1977 [GB] United Kingdom ............... 41916/77

[51] Int. Cl.² .............................................. C01F 7/20
[52] U.S. Cl. .................... 423/126; 423/132; 423/481
[58] Field of Search ................ 423/126, 132, 481

[56] References Cited

U.S. PATENT DOCUMENTS

| | | | |
|---|---|---|---|
| 1,310,413 | 7/1919 | Eberhardt | 423/132 |
| 1,403,061 | 1/1922 | Sieurin | 423/126 |
| 1,777,570 | 10/1930 | Masin | 423/132 |
| 1,868,499 | 7/1932 | Muertler | 423/126 |
| 3,816,605 | 6/1974 | Belsky | 423/139 |
| 4,056,146 | 11/1977 | Hall | 423/132 |

FOREIGN PATENT DOCUMENTS 574983 7/1924 France ........................ 423/132

Primary Examiner—Herbert T. Carter
Attorney, Agent, or Firm—Cooper, Dunham, Clark, Griffin & Moran

[57] ABSTRACT

A process for the production of alumina from siliceous minerals containing substantial quantities of combined aluminium and calcium comprises the steps of treating the finely divided mineral with a hot acid liquor containing chloride, fluoride and calcium ions to extract alumina values from the mineral; recovering aluminium chloride from the liquid extract; recycling one fraction of the spent extract to the mineral extraction stage; and treating another fraction of the spent extract to regenerate hydrogen chloride gas for re-use in the process.

7 Claims, 1 Drawing Figure

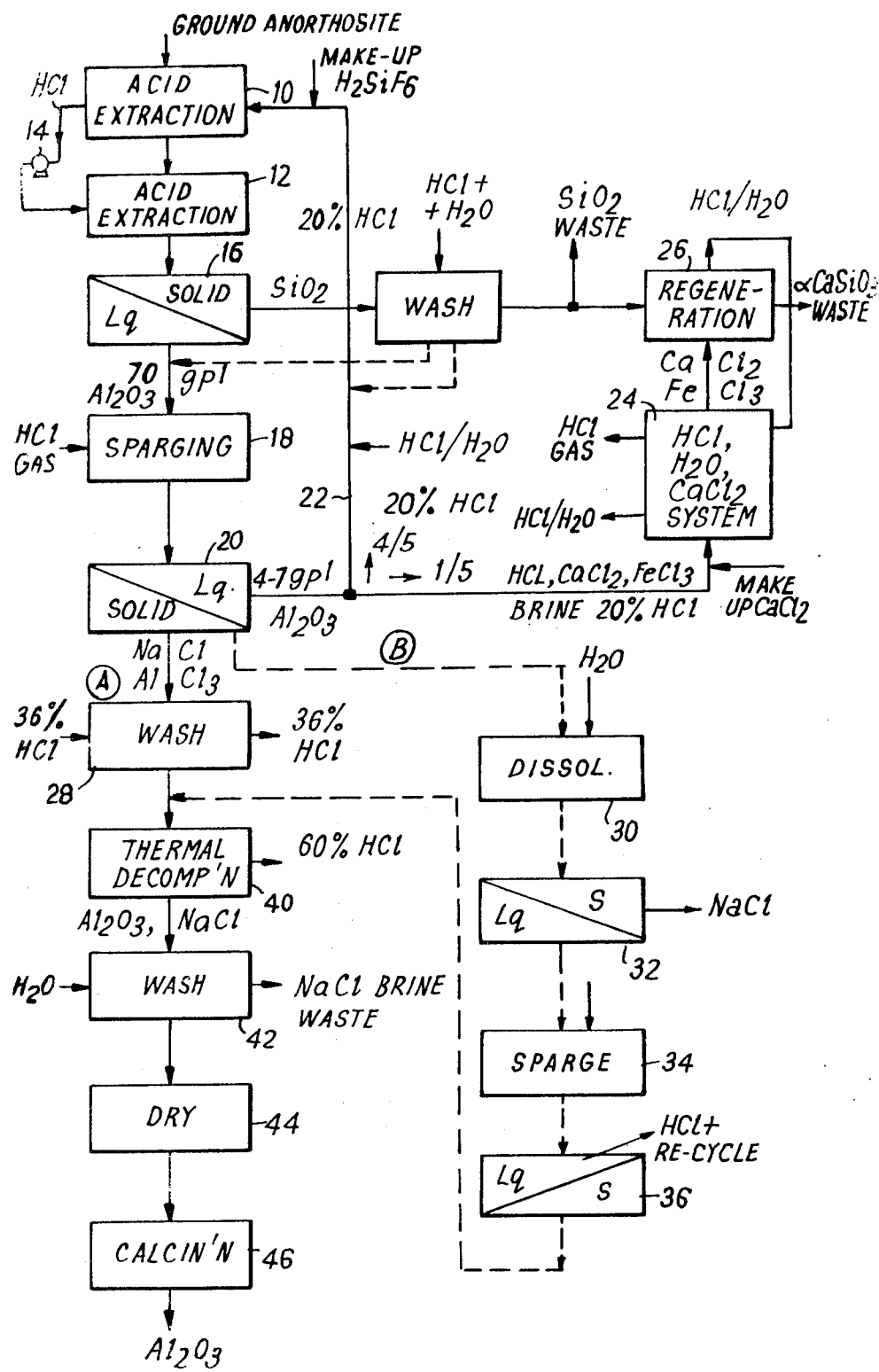

RECOVERY OF ALUMINA FROM SILICEOUS MINERALS

The present invention relates to the extraction of alumina values from siliceous minerals and in particular from such minerals containing substantial proportions of calcium.

Plagioclase minerals, for example, contain large proportions of anorthite ($CaO.Al_2O_3.2SiO_2$), usually in association with albite ($Na_2O.Al_2O_3.3SiO_2$) and occur in large deposits in many countries.

Many processes have been put forward for the extraction of alumina values from such minerals to provide an alternative source for alumina to the recovery of alumina from bauxite by the Bayer process.

Previous proposals for the extraction of alumina values from plagioclases, such as anorthosite, have relied on essentially alkaline reactions. Although at least one such process has been employed in commercial operation to a limited extent, it did not prove economically competitive with the known Bayer process. All the suggested alkaline processes for the recovery of alumina from siliceous minerals have high energy requirements and/or require expensive equipment since all are high temperature and/or high pressure processes.

It has long been known that siliceous minerals can be attacked by hot strong mineral acid solutions to extract alumina values therefrom, but the efficiency of the extraction obtained in terms of percentage extraction of available alumina from plagioclase minerals was low, so that acid attack of such minerals has not been considered as a practicable route for the recovery of alumina values from them.

In U.S. Pat. No. 3,816,605 a method of extracting alumina values from minerals containing kaolinite ($Al_2O_3.2SiO_2.2H_2O$) has been described. In this procedure mineral is attacked with strong hydrochloric acid solution in the presence of a small proportion of hydrofluorosilicic acid. The percentage extraction of alumina values was found to be greatly increased as compared with the extract obtained by the acid attack of uncalcined clay minerals without addition of hydrofluorosilicic acid. However in the described procedure the only substantial impurity taken up into the extract was ferric chloride. This was removed by extraction with an organic solvent. The aqueous acid extract was treated to precipitate alumina values as aluminum trichloride hexahydrate by saturation of the extract with hydrochloric acid.

This prior procedure, which provides a recyclable mother liquor of high purity, does not suggest itself for application to siliceous minerals having substantial contents of soda and lime because of the acid loss arising from the simultaneous production of very large quantities of calcium chloride and sodium chloride and the difficulty of separating the alumina values from such salts.

Furthermore it is known that the rate of attack of acid on a very fine particle aluminium silicate, such as kaolin, would be much higher than on a mineral such as anorthosite which typically occurs in massif form and is a calcium aluminium- and sodium aluminium-silicate.

Nevertheless it has now been found surprisingly possible to devise a procedure for the recovery of alumina values from minerals of this type, partly because it has been found that at least some of these minerals when subjected to grinding form a surprisingly large proportion of very fine particles. In consequence the surface area available for acid attack is high in relation to weight.

Whereas in the prior process described in U.S. Pat. No. 3,816,605 the recycled mother liquor was essentially freed from dissolved chloride salts, the process of the present invention employs recycled mother liquor having a substantial but controlled content of $CaCl_2$ and is arranged so that the amount of calcium taken up in each cycle is removed by treating a part of the liquor to remove its whole calcium chloride content for regeneration of hydrochloric acid in gaseous form by the process described in my co-pending co-currently filed U.S. patent application Ser. No. 946,344. This procedure is very advantageous in that it permits waste calcium chloride to be added to the calcium chloride recovered from the mother liquor so as to make good the inevitable acid losses from the system. This is however not obligatory, because the acid losses can be made good by direct addition of hydrochloric acid, when this can be bought in more cheaply than the cost of generating hydrochloric acid from bought-in calcium chloride by the abovementioned process.

The presence of a large concentration of $CaCl_2$ is useful in another unexpected effect. An HCl process, such as the proposed one, requires removal of water by evaporation. However, $HCl/H_2O$ mixtures are azeotropic and cannot be separated by distillation. Being a known "azeotrope breaker" $CaCl_2$ allows a convenient evaporation of HCl gas and, separately, of water.

In its essential features therefore a process for the production of alumina from siliceous minerals containing substantial quantities of combined aluminium and calcium includes the steps of:

(i) grinding the mineral to a fine particle size, preferably to a size of −200 mesh (ground fine enough to pass through such mesh);

(ii) treating said mineral with a hot acid liquor containing chloride, fluoride and calcium ions to extract alumina values from said mineral;

(iii) separating the acid extract from the spent mineral residues;

(iv) sparging the separated extract with gaseous hydrogen chloride to precipitate aluminium chloride [sodium chloride (if any) is partly coprecipitated but calcium and other impurities remain in solution];

(v) separating the precipitated aluminium chloride from the spent acid extract;

(vi) recycling one fraction of the spent extract to the mineral extraction stage (ii);

(vii) evaporating another fraction of the spent extract to dryness and heating the solid residue with active silica in the presence of water vapour to regenerate hydrogen chloride gas;

(viii) recycling the regenerated hydrogen chloride gas directly to the extraction stage (ii) and/or sparging stage (iv) or absorbing said gas in water for recycling.

In a preferred process the hot regenerated $HCl/H_2O$ gas can be fed into a distillation system where HCl gas is separated from $H_2O$ vapour by a nonazeotropic distillation in the presence of strong $CaCl_2$ solution. The HCl can then be used in the process either as gas or a suitable solution.

The spent mineral residues from the acid extraction stage may be used as the source of active silica for reaction with the calcium chloride-containing residue obtained by evaporation of one part of the spent extract liquor.

In the acid extraction stage the liquor preferably contains 10–28% HCl, preferably 20%, and 1–20 gms/liter fluoride which effectively catalyses the attack of hydrochloric acid on the alumina and other metal values in the siliceous mineral. The fluoride is most conveniently introduced into the extraction liquor in the form of $H_2SiF_6$.

The extraction process is preferably performed at from atmospheric pressure to one atmosphere gauge and at boiling point. The extraction time will vary in accordance with the actual mineral under treatment and with the fineness of the grind. It is however found possible in most instances to extract 90% of the alumina values within 4 hours or 96% within 16 hours from a relatively low-grade anorthosite (26% $Al_2O_3$) using 5 g.p.l. of $H_2SiF_6$.

The calcium chloride content of the recycled spent extract has the effect of allowing the precipitation of aluminium chloride to be achieved from the acid extract at a lower HCl concentration. On the other hand it has the disadvantage that it decreases the solubility of HCl gas in the extraction stage. As a result of this lower solubility, the partial pressure of HCl increases at the beginning of digestion as the temperature rises. In order to avoid the use of heavy pressurized equipment, the pressure can be kept below about one-half atmosphere by performing the acid extraction or digestion in two or more stages and flashing off some vapour in the first stage of digestion. This can then be used in a further stage, or stages, of digestion as the free acid is used up by the mineral. An effective digestion is possible since, surprisingly, we found that the concentration of HCl, in the range 1–10 NHCl, has little effect on the rate of digestion.

These advantages and countervailing disadvantages are all dependent upon Ca concentration in the liquor and Ca content of the extraction liquor is controlled by removal of the Ca content from one part of the spent extract. The relative proportions of the recycled fraction of the spent extract to the evaporated fraction are preferably selected so as to control the Ca content of the hot acid extraction liquor to 70 to 100 gms/liter. It will of course be necessary to introduce additional HCl and fluoride to the acid extraction liquor and the Ca content refers to the extraction liquor after the make-up of HCl, fluoride and water has been added to replace the materials removed from the system in the process.

The HCl sparging of the acid extract from the extraction stage most conveniently saturates the extract with regard to HCl. This precipitates the alumina values as aluminium chloride hexahydrate and also precipitates any dissolved sodium and potassium as their chloride, from which it is relatively difficult to regenerate hydrochloric acid. It is therefore preferred to select an alumina-bearing siliceous mineral having a low sodium and/or potassium content. Additional reasons for selecting a siliceous mineral with a low sodium/potassium content is that such ores tend to have a higher alumina content. It is also found surprisingly that the higher is the Ca:Na ratio in the mineral the more completely may the alumina content be extracted by the acid attack.

In some instances it may be desired to treat the precipitated aluminium trichloride to yield other aluminium salts, such as aluminium sulphate. In most instances it will however be treated to yield alumina. One method that may be adopted to separate the aluminium trichloride yield from contaminating sodium chloride, where such is present in undesirable high proportion, comprises thermal decomposition of the aluminium trichloride to alumina. Such thermal decomposition is carried out at a temperature of about 300° C. in known manner. The contaminating sodium chloride may be removed by washing the alumina with water. This washing is most conveniently effected by a multistage counter-current washing so as to yield a relatively strong brine from the first washing stage (in relation to direction of alumina travel). Surprisingly, the alumina values in the decomposition product were found to be almost insoluble in water. Thus, a minimal loss of Al occurs during NaCl removal, in spite of considerable residual chloride left in the product because of incomplete decomposition.

In the accompanying FIG. 1 there is shown a diagrammatic flow sheet illustrating in greater detail one possible route for obtaining alumina by the use of the process of the present invention.

Referring to the diagram:

(i) Anorthosite is ground to a particle size of −200 mesh (U.S. Standard);

(ii) The ground mineral is treated in two stages 10, 12 with a hot acid liquor containing chloride, fluoride and calcium ions. Some acid vapour is flashed off in the first stage 10 and supplied via pump 14 to the second stage 12 as the free acid is used up;

(iii) The acid extract is separated from the spent mineral residue at 16;

(iv) The separated extract is sparged at 18 with gaseous hydrogen chloride to precipitate aluminium chloride together with some sodium chloride;

(v) The precipitated aluminium chloride and sodium chloride is separated from the spent acid extract at 20;

(vi) One fraction amounting to four fifths of the spent extract from 20 is recycled via line 22 to the first extraction stage 10;

(vii) The remainder amounting to one fifth of the spent extract from 20 is evaporated to dryness at 24. The resulting solid residue is treated at 26 with active silica (the spent mineral residue from 16) in the presence of water vapour to regenerate hydrogen chloride gas;

(viii) This regenerated hydrogen chloride gas may be recycled directly to the first acid extraction stage 10, and/or the sparging stage 18, or may be adsorbed in water for recycling.

The solid mixture of aluminium chloride and sodium chloride resulting from separation 20 may simply be washed at 28 (alternative Ⓐ in the diagram) with 36% hydrochloric acid. Alternatively (alternative Ⓑ in the diagram), the solid mixture may be dissolved at 30, purified by precipitation of sodium chloride at 32, and sparged with HCl gas and re-precipitated at 34, 36. The resulting aluminium chloride is thermally decomposed at 40 to give alumina which is washed at 42, dried at 44 and calcined at 46.

In the system shown in the flow sheet, the HCl/$H_2O$ from the regeneration stage together with the HCl from the wash and thermal decomposition stages for the precipitated aluminium trichloride are introduced into the HCl, $H_2O$, $CaCl_2$ system which serves as the source of HCl gas for sparging and of aqueous HCl streams of concentrations needed in other parts of the circuit. As will be seen from the diagram 4/5th of the liquor from the precipitation stage is recycled direct to the attack vessels whereas the remaining 1/5th is forwarded to the regeneration stage through the HCl, $H_2O$, $CaCl_2$ distillation system.

In one series of tests to determine satisfactory operating conditions for the extraction stage the siliceous mineral employed was a massif-type anorthosite from the area of Lake St. John, Quebec, Canada. This mineral had the following composition (% dry basis):

| $SiO_2$ | $TiO_2$ | $Fe_2O_3$ | $Al_2O_3$ | CaO | MgO | $Na_2O$ |
|---|---|---|---|---|---|---|
| 52.7 | 0.19 | 1.5 | 26.9 | 10.7 | 0.4 | 4.5 |

Typical extraction results are shown in the following Table:

| Anorthosite g. | $H_2SiF_6$ g. | Mesh Size | Time hrs. | Hydrochloric Acid % W/W | Volume ml | Wt. of Residues g. | Extraction % $Al_2O_3$ | % Efficiency |
|---|---|---|---|---|---|---|---|---|
| 50 | 0.5 | −200 | 16 | 24 | 182 | 31.9 | 24.1 | 90 |
| 50 | 1.0 | −200 | 16 | 24 | 182 | 31.0 | 24.7 | 92 |
| 50 | 1.5 | −200 | 16 | 24 | 182 | 29.9 | 26.8 | 99 |
| 50 | 0.3 | −200 | 16 | 24 | 182 | 32.0 | 23.5 | 88 |
| 50 | 0.6 | −200 | 16 | 24 | 182 | 28.8 | 24.3 | 91 |
| 50 | 1.8 | −200 | 16 | 24 | 182 | 30.2 | 24.5 | 92 |
| 50 | 0.9 | −200 | 4 | 24 | 240 | 33.2 | 22.1 | 82 |
| 50 | 0.9 | −200 | 12 | 24 | 240 | 30.4 | 25.6 | 95 |
| 50 | 0.9 | −200 | 4 | 24 | 240 | 33.8 | 21.2 | 79 |
| 50 | 1.8 | −200 | 4 | 24 | 240 | 33.6 | 22.2 | 83 |
| 50 | 3.6 | −200 | 4 | 24 | 240 | 33.6 | 23.6 | 88 |

When the resulting solution was subjected to HCl gassing, crystals of $AlCl_3.6H_2O$ precipitated together with NaCl, but surprisingly free of $CaCl_2$, $FeCl_3$, etc. After heating to 300° C., NaCl was removed by cold water wash. The dried and calcined $Al_2O_3$ (1100° C., 2 hrs.) had the following typical analysis:

Cl, 0.14%; $Fe_2O_3$, 0.02%; $SiO_2$, 0.02%; CaO, 0.05%; $Na_2O$, 0.02%; $TiO_2$, 0.008%.

The overall yield was well over 80%. Surprisingly, the trigonal crystals of $AlCl_3.6H_2O$ had the length/-width ratio of 1.2–1.5 rather than the 2.5–3.0 which is found in the absence of the fluoride ion. This low ratio is advantageous during calcination since it produces less fines by crystal breakdown and the resulting calcined alumina also dissolves more easily in the elctrolytic cell. There is, however, a disadvantage in the presence of fluorine during the crystallization of $AlCl_3.6H_2O$, namely, an inhibition of crystal growth. It has been found that, using the recommended dosage of $H_2SiF_6$ in the extraction stage, a satisfactory compromise can be achieved. With the low grade of anorthosite used, 0.01 to 0.02 ton $H_2SiF_6$ per ton anorthosite results in an extraction rate of 90% and a precipitation yield rate of 90%. Because of the recirculation of 4/5ths of the liquor from the precipitation stage, the overall efficiency reaches approximately 88%.

It is recognized that in industrial practice there may be difficulties in consistently obtaining the standard of purity reported above, in which case recrystallization of $AlCl_3.6H_2O$ from a solution may be necessary. It is advantageous to combine this recrystallization with the removal of sodium chloride. It was found, surprisingly, that the solubility of sodium chloride in saturated aluminium chloride is very low and 95% of sodium present together with aluminium chloride can be separated as crystals when the mixed chlorides are dissolved in a minimum of water (e.g. 0.7 ton water per ton of crystals) and reprecipitated by sparging with HCl. In this way, the bulk of the sodium chloride can be removed in a solid form, convenient for disposal or use. Furthermore, the recrystallization produces aluminium chloride which, after calcination, yields alumina of excellent purity. In particular, the concentrations of MgO, CaO and $P_2O_5$ are very satisfactory and these are impurities which give cause for concern in metallurgical grade alumina made by other known acid extraction processes.

As compared with the extraction efficiency obtained when the anorthosite is ground to −200 mesh, we find that when a coarser grind is adopted, such as −65 mesh or −100 mesh, there is a loss of extraction efficiency, against which may be balanced the reduction in grinding costs.

It has been found in all the extraction tests that in excess of 65–80% of the fluoride remains in the acid liquor. Carryover of fluoride into the product alumina, particularly as $AlF_3$ is very advantageous to its eventual employment in an electrolytic reduction cell, but this loss from the liquor and additional losses in other process stages must be replaced. However these do not have a very significant effect on the process cost.

In a test designed to check the performance of the process under spent liquor recycling conditions the following test was carried out.

40 g of anorthosite containing 26.1% $Al_2O_3$, 0.86% $Fe_2O_3$, 53% $SiO_2$, 0.77% $TiO_2$, 4.95% $Na_2O$, 0.30% MgO, 0.53% $K_2O$ and 11.1% CaO were digested with a mother liquor coming from the (5th) digest of anorthosite.

This liquor contained 1.2 g $Al_2O_3$, 18 g CaO, 2 g $TiO_2$, 2.2 g MgO, 0.01 g $SiO_2$, 0.6 g F and 21.9 g of HCl, to which 0.5 g F (supplied as $H_2SiF_6$) were added. The volume was 167 ml. During the heating of the agitated slurry some HCl was allowed to flash off. Fresh HCl gas was introduced as the free acid was used up by the mineral, but at no time was the pressure allowed to exceed one half-atmosphere (7 psig). The residue was filtered-off, washed and the washings evaporated and combined with the filtrate to give 170 ml volume. The solution was sparged with gaseous HCl for (3) hrs. at 40° C. and at one-half atmosphere pressure.

The crystals were filtered-off, washed with a saturated HCl solution and found to contain 9.4 g $Al_2O_3$ and 1.58 g $Na_2O$. They were redissolved in 28 ml of water and reprecipitated by sparging with HCl at 70° C. After another filtration and wash with 36% HCl, the crystals contained 9.1 g $Al_2O_3$ and 0.18 g $Na_2O$. They were decomposed, washed and calcined as described previously. The product had the following purity 0.004% CaO, 0.012% $SiO_2$, 0.009% $Fe_2O_3$, 0.005% MgO, 0.005% $TiO_2$, 0.0002% $P_2O_5$, 0.12% $Na_2O$.

In order to check the applicability of the spent residue of the acid extraction stage as a source of active silica for regeneration of hydrochloric acid from the evaporated fraction of the spent extract the following test was carried out:

Anorthosite residue (after HF-catalyzed HCl attack) was mixed with ground $CaCl_2.2H_2O$ in the molar ratio of $2SiO_2:1CaO$. The mixture was briquetted at 10,000 psi and placed in a boat in a tubular glow-bar furnace. After about 30 minutes at 1100° C. the mixture lost all its chlorine (% Cl in residue <0.1%)

$$H_2O + CaCl_2 + SiO_2 \rightarrow CaSiO_3 + 2HCl.$$

No melting was observed and the briquettes had a very low apparent density after reaction. The X-ray diffraction analysis of residues revealed the presence of α-$CaSiO_3$, crystoballite ($SiO_2$) and some $CaO.Al_2O_3$.

I claim:

1. A process for the production of alumina from siliceous materials containing substantial quantities of combined aluminium and calcium, comprising the steps of:
   (i) grinding the mineral to a fine particle size;
   (ii) treating the ground mineral with a hot acid liquor containing chloride, fluoride and calcium ions to extract alumina values from said mineral;
   (iii) separating the acid extract from the spent mineral residues;
   (iv) sparging the separated extract to precipitate aluminium chloride;
   (v) separating the precipitated aluminium chloride from the spent acid extract;
   (vi) recycling one fraction of the spent extract to the mineral extraction stage (ii);
   (vii) evaporating another fraction of the spent extract to dryness and heating the solid residue with active silica in the presence of water vapour to regenerate hydrogen chloride gas;
   (viii) recycling the regenerated hydrogen chloride gas directly to the extraction stage (ii) and/or sparging stage (iv) or absorbing said gas in water for recycling.

2. A process as claimed in claim 1, wherein spent mineral residues from the acid extraction stage (ii) are used as the source of the active silica for step (vii).

3. A process as claimed in claim 1, wherein the hot acid liquor used in step (ii) contains 10–28% HCl, 1–20 grams/liter fluoride and 70 to 100 grams/liter calcium.

4. A process as claimed in claim 1, wherein the acid extraction step (ii) is performed at from atmospheric pressure to one atmosphere gauge and at boiling point.

5. A process as claimed in claim 1, wherein the acid extraction step (ii) is performed in two or more stages, pressure in the first stage being kept down by flashing off some vapour and using this in a later stage as free acid is used up by the mineral.

6. A process as claimed in claim 1, wherein the aluminium chloride from step (v) is recrystallized to free it from sodium chloride.

7. A process as claimed in claim 1, wherein aluminium chloride from step (v) is thermally decomposed to yield alumina.